United States Patent [19]

Perkins

[11] Patent Number: 5,418,628
[45] Date of Patent: May 23, 1995

[54] INTEGRATED DATA COMMUNICATION SYSTEM

[76] Inventor: John L. Perkins, 13 Mitford St., St. Kilda, Victoria 3182, Australia

[21] Appl. No.: 859,485
[22] PCT Filed: Dec. 21, 1990
[86] PCT No.: PCT/AU90/00608
　§ 371 Date: Jun. 15, 1992
　§ 102(e) Date: Jun. 15, 1992
[87] PCT Pub. No.: WO91/10309
　PCT Pub. Date: Jul. 11, 1991

[30] Foreign Application Priority Data

Dec. 22, 1989 [AU] Australia .................. PJ7993

[51] Int. Cl.⁶ .................................. H04N 1/40
[52] U.S. Cl. .......................... 358/468; 358/401; 358/442
[58] Field of Search ............ 358/400, 401, 407, 435, 358/436, 438, 439, 404, 405, 442, 468; H04N 1/00

[56] References Cited

U.S. PATENT DOCUMENTS

| 4,918,722 | 4/1990 | Duehren et al. | 358/407 |
| 4,994,926 | 2/1991 | Gordon et al. | 358/400 |
| 5,065,427 | 11/1991 | Godbole | 358/400 |
| 5,091,790 | 2/1992 | Silverberg | 358/434 |
| 5,136,634 | 8/1992 | Rae et al. | 358/435 |
| 5,227,893 | 7/1993 | Ett | 358/400 |

FOREIGN PATENT DOCUMENTS

| 0212199 | 3/1987 | European Pat. Off. | H04N 1/42 |
| 0291307A2 | 11/1988 | European Pat. Off. | H04G 11/04 |
| 0337610A2 | 10/1989 | European Pat. Off. | H04N 1/42 |
| 426412A2 | 5/1991 | European Pat. Off. | H04N 1/32 |
| 1168160 | 7/1989 | Japan | H04N 1/32 |
| 10989 | 9/1990 | WIPO | H04N 1/32 |
| 9325041 | 12/1993 | WIPO | H04N 1/32 |

OTHER PUBLICATIONS

Applicant, please note!Application #40703/85 is not considered since a publication date cannot be determined.

Primary Examiner—Stephen Brinich
Assistant Examiner—Jerome Grant
Attorney, Agent, or Firm—Biebel & French

[57] ABSTRACT

An integrated communication system for the transception of facsimile data or binary file data is described. The system comprises a conventional facsimile machine having the components of a scanner, sampling device, transmission memory, compression device and modem connected to a telephone line of a public switched telephone network all being for the transmission of facsimile data and decompression device, reception memory, recording memory and recording device all being for the reception of facsimile data. These components are under the control of the operations microprocessor and user interface. The binary file data transfer components are the Tx/Rx memory, floppy disk controller and floppy disk drive, again, all under the control of the operations microprocessor. The binary file transfer is achieved either by control codes inserted in the Non Standard Filed (NSF) of a facsimile transmission conducted under the CCITT Recommendation T.30, or the proposed amendments to the DIS/DTC/DCS signals of the same T.30 Recommendation as are under consideration.

8 Claims, 8 Drawing Sheets

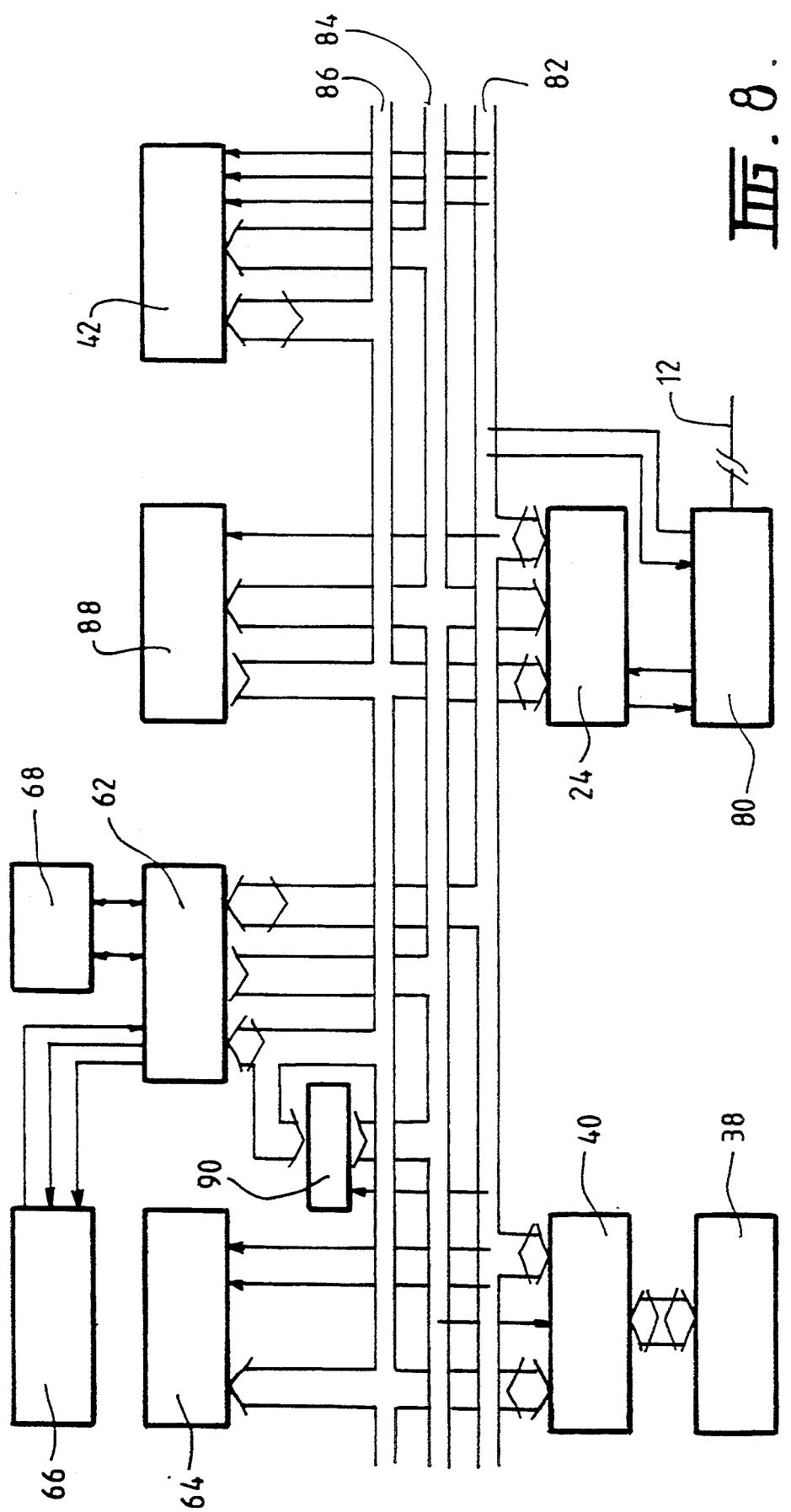

INTEGRATED DATA COMMUNICATION SYSTEM

TECHNICAL FIELD

This invention relates to an integrated data communication system, and relates in particular to apparatus permitting binary file transfer, and as an option, although not exclusively, binary file transfer in conjunction with facsimile transception.

DESCRIPTION OF THE PRIOR ART

Facsimile machines provide for speedy document transfer between locations, however they have a number of drawbacks, particularly in relation to the joint preparation of documents using word processors at different locations. This task requires that each version of a document be printed and transmitted by facsimile to one or more other parties, then retyped into a different word processor for further editing. Such a procedure is time consuming and awkward.

Other electronic communication techniques have evolved in parallel with facsimile machines, these being directed to the provision of data transfer between various locations.

A first example of this is modem to modem communications between computers, whereby each computer must support like communication software to facilitate the exchange of information, and particularly compatibility of the respective operating system, modems and the communication protocol. In addition, it is necessary to have technically skilled operators involved. Modem to modem transfers can provide interactive communications between various computers including file transfers of data or other information such as word processing files.

PC-Fax communication systems have recently been developed, whereby a PC can have a card added as hardware to facilitate a similar function to that of a facsimile machine. The PC can take any text file or video file, as are commonly used in many current word processors, and code convert the data into a format suitable for transmission as a facsimile. The PC and the receiving facsimile machine will conduct all the call establishment and pre-message procedures in order to set up communication, but the receiving facsimile machine will believe it is communication with another facsimile machine. The received information is then processed as usual.

If the receiving machine is a PC-Fax, the incoming facsimile transmission can be viewed on a screen or optionally printed using a printer with graphics capability. However, substantial optical or pseudo-optical character recognition procedures are required in order to reproduce the original document in text form, this requiring powerful processing and substantial memory capability. Therefore, PC-Fax to PC-Fax communication is not of practical interest, rather only the PC-Fax to facsimile machine communication has practical value, in that a sender need not purchase a facsimile machine to send faxes.

Within certain of the PC-Fax cards, binary file transfers are possible between cards of a similar manufacture and design. Such binary file transfer procedures require the full facilities of a PC, and are not possible with existing facsimile machines acting as a receiver.

Some facsimile machines have the capability of connection to PC's, but the functions achieved by such connections are limited to localized image transfer and document printing operations.

In no prior art systems is it possible to combine conventional facsimile techniques with conveniently operated non-facsimile or binary file transfers.

OBJECT AND STATEMENT OF THE INVENTION

It is therefore an object of the invention to overcome one or more of the drawbacks in the prior art, and to provide apparatus for the convenient transmission and reception of binary file data and, as an option, also facsimile data at the option of a user.

Therefore, the invention provides an integrated communication system comprising a facsimile transceiver and a data transceiver, whereby, in use, the system can optionally:

(a) transceive documents to or from said facsimile transceiver; or (b) transceive binary file data to or from said data transceiver;

further comprising interface means which is user selectable to permit a choice of, at least, whether documents are transceived or whether binary file data is transceived.

The invention also provides a facsimile machine for the transmission of documents, said facsimile machine being operable to provide facsimile transmission or binary file data transmission and further comprising:

data storage means; and interface means which is selectable to permit a choice of whether documents are transmitted or whether binary file data is transmitted from said data storage means or both.

The invention further provides an integrated facsimile and binary file data transceiver comprising:

optical means for scanning a document to be transmitted or recording a document to be reproduced;

memory means for reading binary file data contained thereon or writing binary file data thereto;

a controller in communication with the optical means and the memory means;

a transceiver means in communication with the memory controller for the transception of facsimile information or binary file data; and a user interface in communication with the controller for selecting facsimile transception and/or binary file data transception or both.

The invention further provides a binary file transceiver adapted for connection to a facsimile machine and comprising:

memory means for reading binary file data contained thereon or writing binary file data thereto; and a controller in communication with the memory means and adapted for connection to a modem in facsimile machine;

wherein the binary file data transceiver is operable to transceive binary file data by either control codes inserted in the Non Standard Field of a facsimile transmission conducted under the CCITT T.30 Recommendation or the modified DIS/DTC/DCS signals of the CCITT T.30 proposals as described herein.

The invention further provides a binary file data transceiver adapted for connection to public switched telephone network and comprising:

a modem connectable to the said public switched telephone network;

memory means for reading binary file data contained thereon or writing binary file data thereto; and a controller in communication with the memory means and the modem;

wherein the binary file data transceiver is operable to transceive binary file data by either control codes inserted in the Non Standard Field of a facsimile transmission conducted under the CCITT T.30 Recommendation or the modified DIS/DTC/DCS signals of the CCITT T.30 proposals as described herein.

The invention further provides a binary file transceiver, adapted to be interposed between a telephone line and a facsimile machine so as to be transparent to any transceived facsimile data, comprising:

memory means for reading binary file data contained thereon or writing binary file data thereto;

modem means adapted for connection both to a public switched telephone network and a facsimile machine;

processor means having control over the transception of binary file data;

switch means for providing a connection between the public switched telephone network and the facsimile machine under control of the processor means in the event of the facsimile data transmissions, or connecting the public switched telephone network only to the processor means in the event of binary data file transfer;

interface means to provide for selectable transception of binary file data.

BRIEF DESCRIPTION OF THE DRAWINGS

In order that the invention may be more fully understood, examples of embodiments will be described in some detail with reference to the accompanying drawings, in which:

FIG. 8 shows a stand-alone system constructed in accordance with the invention.

FIGS. 2 and 4 have been extracted from Recommendation T.30 of the CCITT, Vol. VII.

FIG. 3 is extracted from a proposal of the CCITT Study Group VIII—Contribution 43 of August, 1989 (COM VIII-43-E).

DETAILED DESCRIPTION OF PREFERRED EMBODIMENTS

Figure 1:
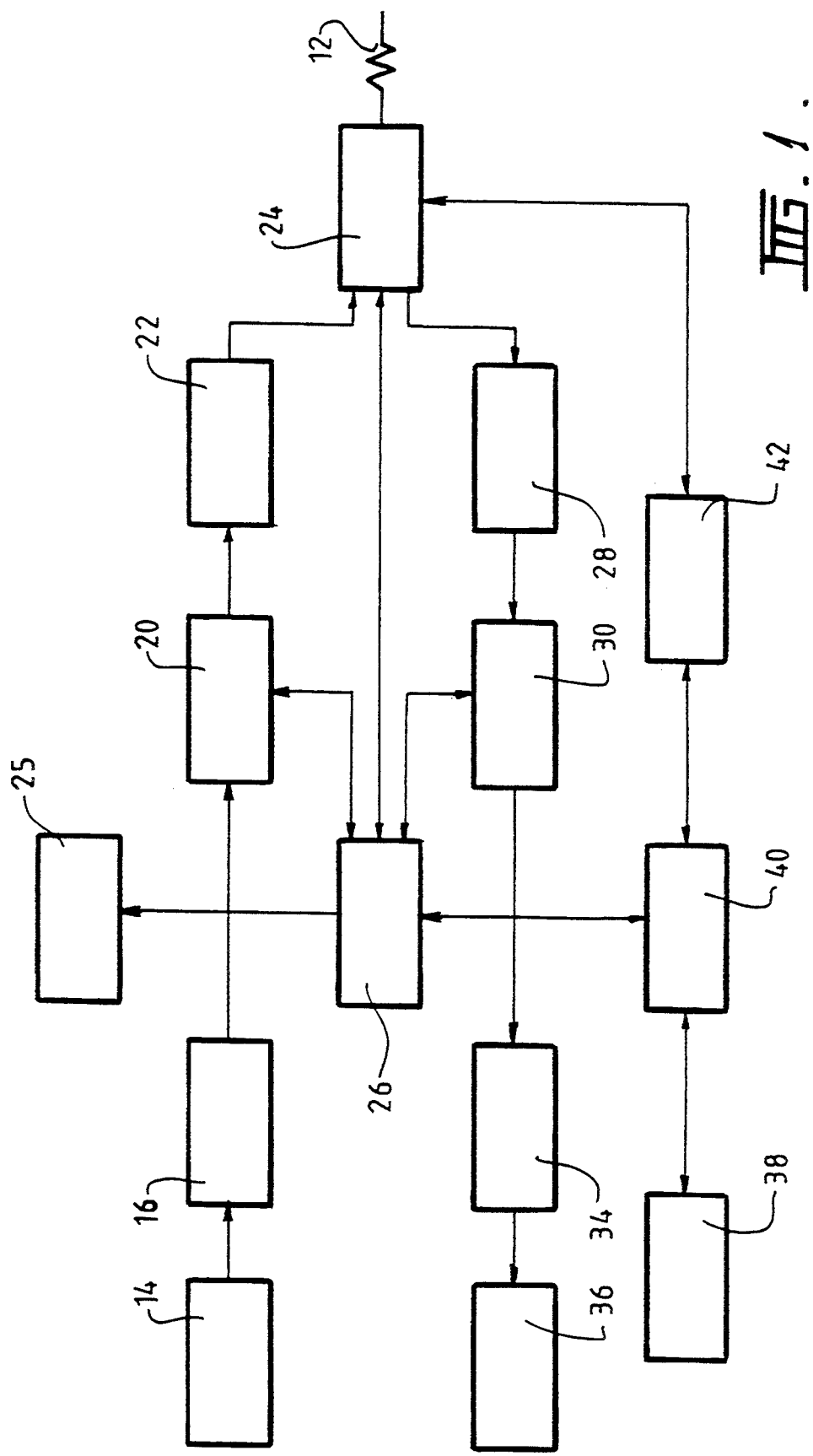
FIG. 1 shows an integrated communication system constructed in accordance with the invention.

FIG. 1 illustrates functional components of an integrated communications device. As such, the device 10 is suitable for connection to any other fax machine, whether or not of the same type, by a telephone line 12 on a public switched telephone network.

It is convenient to firstly describe the conventional facsimile components of the device 10, which in this example is a Group 3 type.

A document to be transmitted to another facsimile machine is initially read by the optical scanner 14. The scanner 14 is under control of the sampling device 16 which generates 1728 pels per line scanned (viz; were each pixel can only have a logic value of $f1$" or "0" corresponding to either black or white respectively) for each page of the document being read. Typically, the page is scanned and sampled with a resolution of optionally 100 or 200 lines per inch (approximately) in the feed direction, and 200 lines per inch (approximately) in the scan direction.

The sampled information, now in the form of rows, is provided to the transmission memory 20. The data stored in the transmission memory 20 is ready for transmission. The device 10 sets up the facsimile call with a receiving machine in accordance with Phases A and B as set down in the CCITT Recommendation T.30 (shown in FIG. 2). This operation is under the control of operations microprocessor 26, and will be described in more detail presently. Once this occurred and the connection is made, data is fed to compression device 22.

The compression device 22 has the function of converting the data into modified Huffman code for a one-dimensional code, or modified READ (relative element address designate) code for two-dimensional codes, which are compression techniques designed to reduce the time taken to transmit any one page of the document. The two-dimensional code technique may also provide for skipping white sections of the scanned document, given that approximately 85% of any page is white.

Some facsimile machines provide for gray scale encoding of a scanned document, in which case, the number of bits (say 2) may represent one pixel of the document. Each pixel can then be represented as one of a possible number of intensities.

The output from the compression device 22 is provided to modem 24, being already connected to the telephone line 12, which performs the transmission along the public switched telephone network to the receiving facsimile machine in accordance with CCITT V.27ter or V.29 standards.

The interaction of an operator of the device 10 is provided by user interface 25 which communicates with operations microprocessor 26. The user interface 25 typically includes a telephone handset, dialling pushbuttons, and operational facilities for any other functions supported by the facsimile machine, such as half tone, redial, polling and such. The operations microprocessor 26 receives any instructions issued by a user through the user interface 25 and also may provide an indication to the user interface 25 of the status of the transmission, typically including the page number being transmitted, the number of the receiving facsimile, its type and such. The operations microprocessor 26 also provides the various control functions to the modem 24, the transmission memory 20 and receiving memory 30 and floppy disk controller 40 as illustrated in FIG. 1.

When receiving a facsimile, the receiving functions of the device 10 are implemented. The received data arrives on telephone line 12 at modem 24, where it is passed to the decompression device 28, which will insert all the blank spaces and remove any timing or framing information which was required to institute the communication between the modem of the transmitting facsimile machine and the modem 24. The decompressed data is then passed to receiving memory 30, where it is stored until able to be processed.

The received information is routed to recording memory 34 under control of the operations microprocessor 26, which then provides the information line by line to recording device 36 which reproduces the original document on the recording medium.

Figure 2:
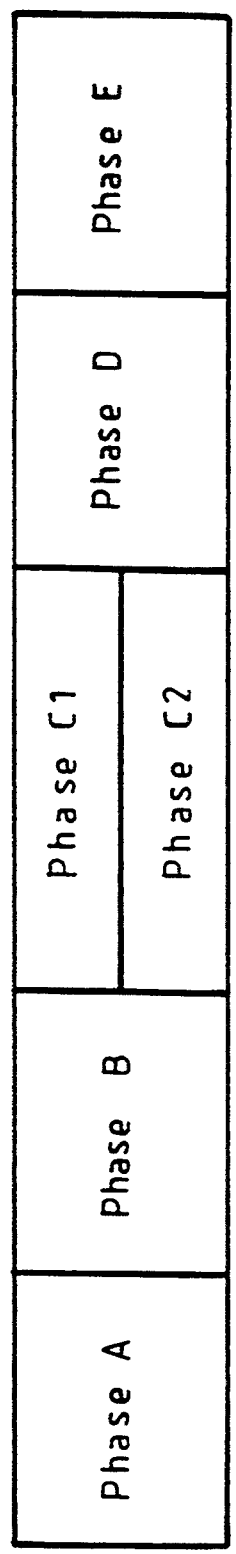
FIG. 2 shows the four phases in a facsimile transmission for Group 3 facsimile machines.

In any transaction to or from device 10, a telephone call set up must be performed. This set up commences in accordance with CCITT Recommendation T.30 for Group 3 facsimile machines. FIG. 2 shows the five Phases A-E in a facsimile transmission. Phase A is the call establishment phase in which the telephone call is placed. Phase B follows, where the called station (acting in identifying mode) responds with signals indicating its capability in terms of group type, speed, resolution, special capability such as half tone, and such. There is a training sequence relating to synchronization, equalisation and other functions.

When the two machines have been trained and are in effective connection, the transmission of the encoded and compressed facsimile information takes place as Phase C. Once the complete document has been transmitted, Phase D is entered. If the information has been received without error control may return to Phase B, otherwise Phase E is entered, which places both the transmitting and receiving machines on-hook.

The function of the facsimile components and tranception as described are well known and understood.

In accordance with one embodiment of the invention, it is considered advantageous to be able to transfer information stored on a floppy disk directly to another floppy disk utilizing the existing facility of a facsimile machine. The transmission of the data may take place under the existing T.30 Recommendation utilising the non-standard file (NSF) function in phase C, or by modification of the digital command signal (DCS), digital identification signal (DIS) and digital transmit command (DTC) as proposed for binary file transfer by Study Group VIII of the CCITT. However, unlike the operations utilized by PC-Fax cards, no file names will be specified. All files residing on a source disk will be transmitted and copied to a target disk.

In regard of both proposals for the transception of binary files, the functions specified in the T.30 Recommendation and the recent proposal by Study Group VIII as referred to earlier are incorporated herein by reference.

In an example of a typical operation sequence using the machine 10 for transmission and a like machine for reception, the operator would prepare a document indicating that a disk transmission was to follow. The transmission then takes place as is usual with the document being transmitted, and following completion of that documentary transmission, the operator must activate a disk transfer pushbutton on the user interface 25, having already installed the floppy disk containing the files to be transferred in the floppy disk drive 38. The files in the form of binary file data are then passed to the data transception memory 42 via the floppy disk controller 40. From the transception memory 42, the binary file data is passed to the modem 12, and thence to the receiving machine. The converse order applies equally for reception.

This operation again takes place under the control of the operations microprocessor 26. The precise interaction between the facsimile procedure and the data transfer procedure will be described presently.

The proposed binary file transfer (BFT) procedure encodes a file including its attribute, in the form of a binary page, which is logically equivalent to a facsimile page. This is transmitted, preferably using Error Correction Mode (ECM).

Assuming that the receiving machine is of the same type as the transmitting device 10, it will receive the information into modem 24, whereupon the data is passed by the reverse procedure to a floppy disk within the floppy disk drive 38.

If there has not been a floppy disk provided in floppy disk drive 38 of the receiving machine after a transmission of binary file data has been instigated, the floppy disk controller 40 will signal the user by operations microprocessor 26, and in turn the user facility 25 that such is required. Typically, this will include an audible and/or visual warning, and avail an operator some limited time in which to insert a disk, else the reception will be terminated.

Similarly, if the receiving machine does not have the facility for reception of data, as would be the case for normal facsimile machines, the sending machine will have some time-out period before the transmission is terminated.

The binary file transfer as discussed results in all files being transferred automatically. This, therefore, allows ease of transfer of data without the requirements of operators or technicians or compatible communication software and expensive hardware such as a PC.

If the receiving machine is not compatible, this will be detected by the digital handshaking procedure in Phase B and will be indicated to the operator, in which case no data transmission will take place.

Once the binary file data transfer is completed, the operator has a further opportunity to transmit another facsimile or data files contained on another floppy disk.

Figure 3:
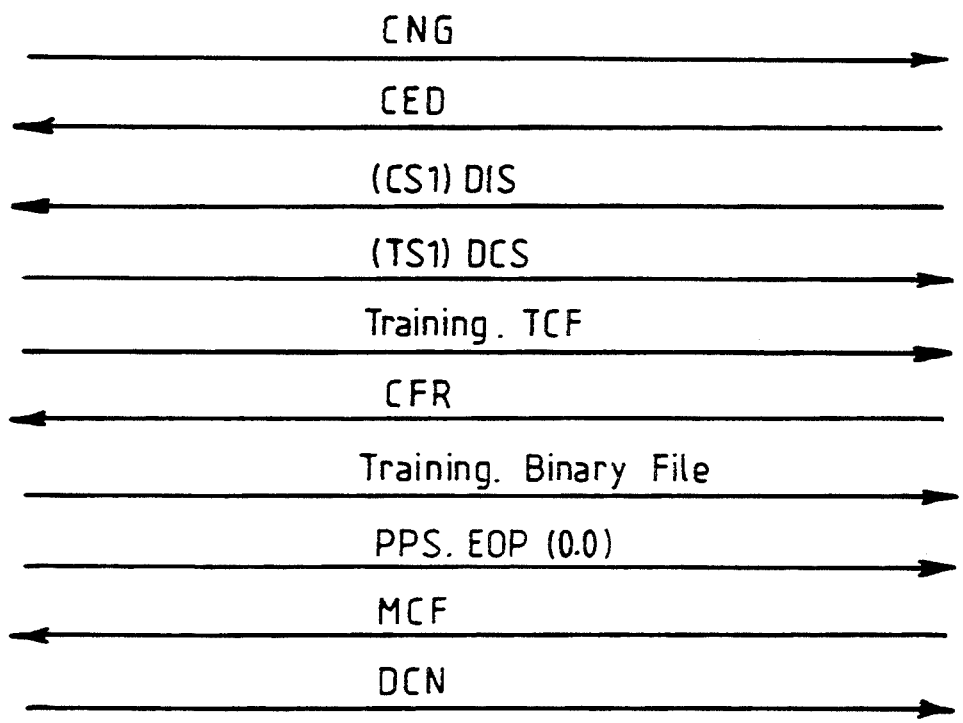
FIG. 3 shows the code exchange sequence between transmitting and receiving facsimile machines in accordance with the proposed amendments to the CCITT T.30 Recommendation.

The process of providing binary file data transfer in addition to or in place of conventional facsimile transmission will now be described in detail, and particularly firstly with reference to FIG. 3.

In order to initiate a binary file transfer, Phase B is entered or re-entered using the proposed modified DIS/DTC/DCS signals. The binary file may be coded as a binary page, which can then be transferred by ECM, as the equivalent of a facsimile page, using the same pre-message and post-message procedures.

Specifically, binary file date transfer capability will be indicated by the appropriate control signal or code in the DIS/DTC frame. The appropriate code when set in the DCS frame indicates that the transmitter has a binary file to transmit.

If the receiving machine is not compatible this will be detected by the digital handshaking procedure and will be indicated to the operator. No data transmission will take place.

If the binary file data is received correctly a message confirmation (MCF) is sent according to the usual protocol procedure. Otherwise the file diagnostic message (FDM) signal, as proposed by Study Group VIII of the CCITT, will be sent. Specific error types relating to the status of the receiving disk may be defined.

Following this procedure, control may then transfer to Phase B and continue with the next binary file data transfer or facsimile. In the present case, the process will continue until all the files in the source disk have been transmitted.

Because of the binary coded nature of the file and its attributes, the binary file date transfer procedure is not restricted to any particular disk format. Although IBM compatible disk formats would normally be provided, according to an alternative aspect, any disk drive and controller, compatible with the user's requirements, may be provided.

Once all the data has been transferred from the transmitting machine to the receiving machine, the transception memory 42 will empty. In one instance, assuming no further data or facsimiles are to be sent, Phase D is effected. In the other instance, Phase E is entered immediately, thus not providing an opportunity transmit further data or facsimiles.

The binary file data transfer under the modified DIS/DTC/DCS proposal can equally take place from either Phase D or Phase B to commence Phase C.

As an alternative to the procedure for binary file transfer as described above, the use of the NSF frame to indicate a non standard procedure could also be adopted for the purpose of initiating the disk data transfer. This is in accordance with the current T.30 Recommendation.

Figure 4:
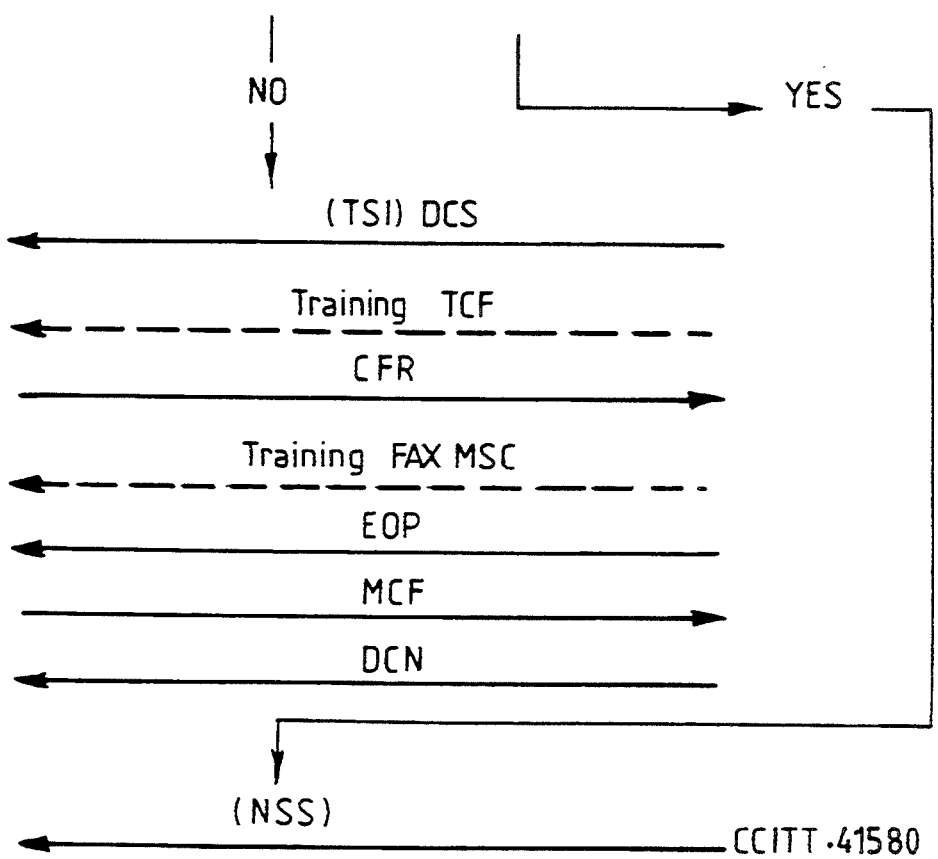
FIG. 4 shows the code exchange sequence between transmitting and receiving facsimile machines in accordance with the existing CCITT T.30 Recommendation.

FIG. 4 shows an example of the codes exchanged between a transmitting machine (calling unit) and a receiving machine (called unit) in a non-standard operation sequence.

The sequence shown represents the start of Phase B and the respective signals transferred between the calling unit and the called unit.

Non-standard facilities are available as shown, and if this is to be implemented, a jump to the NSS (non-standard setup) code is made, whereafter, the operations microprocessor 26 assumes control to commence the binary file data transfer.

The NSF/NSS procedure as described has identical effect as the modified DIS/DTC/DCS are described earlier.

The embodiment described has the advantages of providing an integrated data and document facsimile transmission system, which provides ease of use for an operator. Further, the operator need not have particular technical ability nor expertise, merely being required to place a floppy disk in a floppy disk drive 38, and activating the correct pushbutton sequence to affect optionally a facsimile document transmission or a binary data file transmission, or indeed a combination of both.

A further embodiment is related to a modified PC-Fax card, which utilizes the signalling relevant to the proposed disk transfer protocol. In this case the PC will seek to operate in conjunction with an existing stand-alone fax machine. The PC will only intervene when binary file transfer signalling is detected, at which point it will prompt the user to insert a disk for either transmission or reception of the binary file data. This function could possible be obtained by a modification of operational software.

Two further embodiments are:
(1) a standalone device, capable of sending and receiving files on disk, which operates as described above, using fax protocol for binary file data transfer, but which contains only a disk drive, modem and controller with no scanner or printer, and does not operate in association with an existing fax machine. This machine would be used solely for the purpose of disk transfers in a manner compatible with fax machines, with disk transfer capability, and PC-Fax cards which utilize the propose standard binary file data transfer procedure.
(2) a standalone device with the sole purpose of automatic disk transfer functions, as just described but with the additional capability of utilizing alternative file transfer protocols, in a manner compatible with existing PC-modem file transfer operations and with similar machines.

Figure 5:
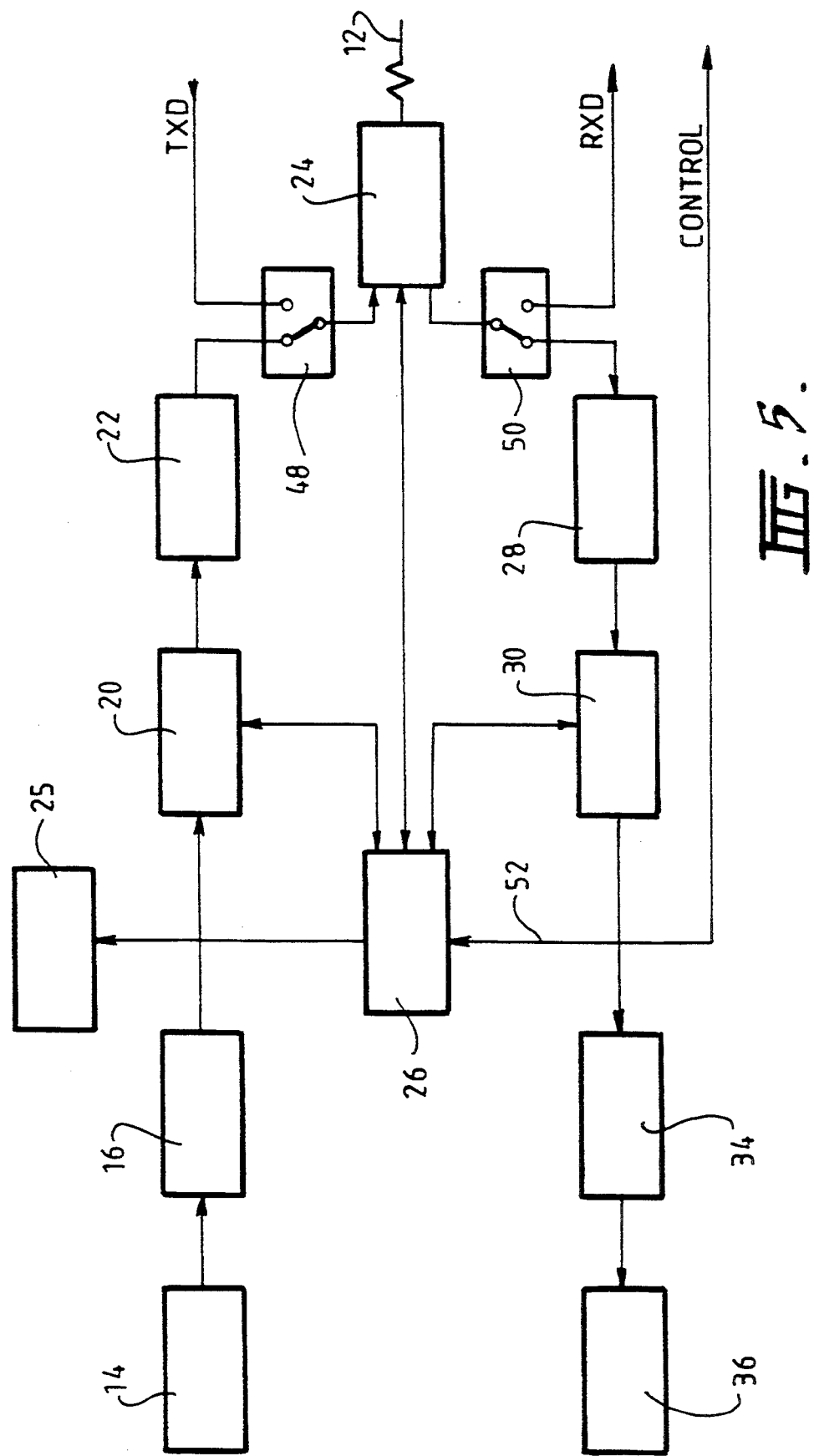
FIG. 5 shows another integrated communication system constructed in accordance with the invention.
Figure 6:
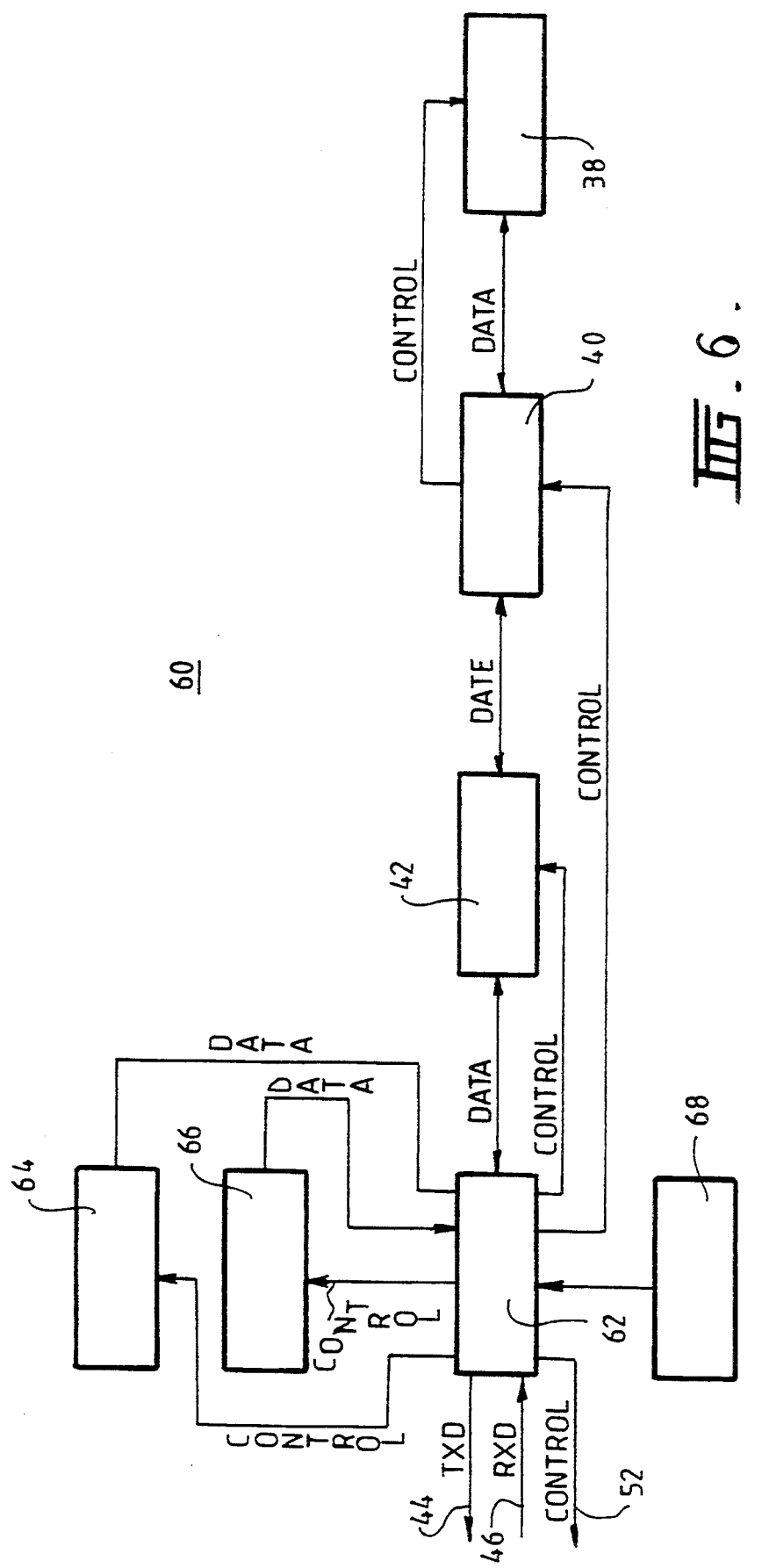
FIG. 6 shows detail of a circuit which can be connected to the system of FIG. 5.
Figure 7:
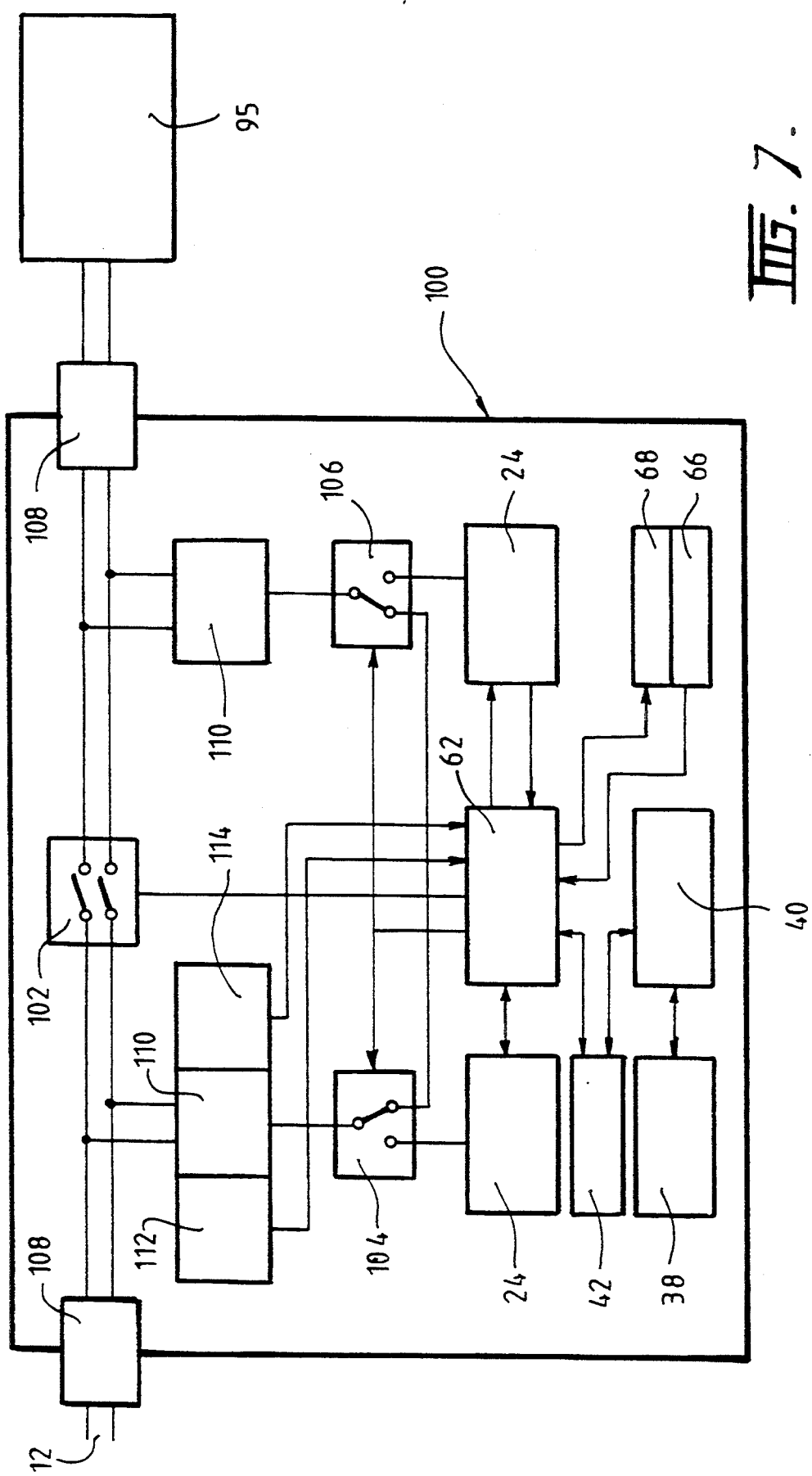
FIG. 7 shows circuit detail of the elements within the systems of FIGS. 1 and 5 at a system architectural level.

As a basis for all these two embodiments, reference is made to FIGS. 5, 6 and 7.

FIG. 5 shows an alternate configuration to the device 10 of FIG. 1. Like elements have been referred to by the same reference numerals. However, the elements associated with the floppy disk control and binary file transception are remote, and provided on lines 44 (TXD) and 46 (RXD). These lines 44,46 are connected by the switches 48,50 which are under the control of the operations microprocessor 26.

FIG. 6 shows the connection for the RXD and TXD lines to a subsystem 60 which could be as a remote unit attached to a facsimile machine, in which case a control line 52 between the operations microprocessor and the subsystem processor 62 would be required, or if provided with a fax modem as per modem 24, could be truely stand-alone, connecting to the public switched telephone network and transceiving only binary file data.

In FIG. 6, the lines RXD and TXD are provided to the subsystem processor 62. The subsystem processor 62 has control over the reading or writing of binary file data from or to a floppy disk contained within the floppy disk drive 38, and also over the operator related functions of the user interface formed by the status display 46 and user keypad 66.

The program memory 68 provides software which is required during processing of received binary file data. It is important to note that when the subsystem 60 is connected to the device of FIG. 5, the operations microprocessor 26 as shown in FIG. 5 still retains overall control of the transception of either facsimile data or binary file data.

The function of the data transception memory 42, the disk drive controller 40 and floppy disk drive 38 is equivalent to that discussed in relation to FIG. 1. The appropriate control lines and data lines are also shown connecting all elements within the subsystem 60.

In the stand-alone option, of course, only the elements shown in the subsystem 60 would be provided, and allows transmission or reception of binary file data only. As noted, a facsimile modem would have to be incorporated with lines TXD and RXD, and furthermore, the subsystem processor 62 would need to be able to perform the normal facsimile phases as detailed in FIG. 2, although could not provide for reception of conventional facsimile data. If a normal facsimile machine where to attempt to transmit facsimile data to such stand-alone device, the sequence of events described in relation to such a regular transfer could not take place, and the subsystem processor 62 would pass signals to the facsimile machine to indicate that data transmission is required, and possibly place the facsimile machine on-hook.

FIG. 7 gives further detail of the elements shown in FIG. 6 at a system architectural level. Where appropriate, like numerals have been used.

Three buses are shown, being for data 86, addressing 84 and control 82.

Connection to the public switched telephone network is via the telephone line 12, which terminates at the line interface 80. The line interface 80 has connection to the control bus 82, and to the facsimile modem 24.

The figure does not show the associated facsimile elements 14, 16, 20, 22, 28, 30, 34 and 36 as in FIGS. 1 and 5, however, the user keypad 66 and display 68 are shown as is the subsystem processor 62 and program memory 68. The disk drive controller 40 and floppy disk drive 38 are also shown, together with data transception memory 42.

The subsystem processor 62 is shown, as is buffering by address latch 90. The only other additional element is a read-only memory 88, in which can reside other software relating specifically to the binary file data transfer.

The functioning of the various system buses in relation to binary file transfer in association with the elements shown would be readily apparent to those skilled in the art.

A further embodiment relates to a stand-alone device 100 as shown in FIG. 8, which is interposed between the telephone line 10 and a conventional facsimile machine 95. In the course of simple facsimile transception, the device is effectively transparent.

When a facsimile call is received, the call is detected by both the stand alone device 100 and the facsimile machine 95. The circuit to the facsimile machine 95 are broken at this time by switch 102, with the device 100 routing the signals via switches 104, 106 thereby maintaining the facsimile machine 95 in the call establishment. The device 100 then decodes the hand shaking signals from the transmitting facsimile or other binary file transfer device to determine whether normal facsimile data is to follow or binary file data transfer is intended.

If normal facsimile data is to follow the switch 102 is activated to re-establish direct communication with the facsimile machine 95. This then allows the high speed transfer of Phase C to take place. If, on the other hand, binary file data transfer is intended, the subsystem processor 62 disconnects the facsimile machine by switches 102 and 106, then proceeds to receive the binary file data and write it to a floppy disk contained within the floppy disk drive 38.

The device 100 can also provided for transmission of binary file data as well as reception as just described.

Referring to the elements of FIG. 8 in more detail. The telephone line 12 is terminated at connector 108, with a similar connector 108 provided for the connection to the facsimile machine 95.

The line interface units 110 perform an isolating function from the physical layer implementation of the public switched telephone network. Associated with one line interface unit 110 is ring detection section 112 and line loop detect section 114.

The other components have been described previously in relation to other embodiments, suffice to say two modems 24 are required to demodulate the data for processing by the subsystem processor 62, and subsequent modulation for passing to the facsimile machine 75.

This embodiment has the advantage of being transparent to normal facsimile transmissions, being cheap to manufacture as easy to install, whilst availing an operator a convenient means to effect binary file data transfers.

I claim:

1. An integrated communications system using facsimile communication protocols comprising:
    a facsimile transceiver and a binary file data transceiver connected to a communications channel so that both said transceivers are either at a source origination or at a target destination,
    processor means interconnecting said binary file data transceiver with said facsimile transceiver, said processing means controllable during one continuous session,
        a.) as a target destination, to look for control signals in a frame of an incoming transmission on the communications channel to determine if the transmission is a facsimile or binary data file and to switch said facsimile transceiver to receive the transmission if it is signalled as a facsimile transmission and, to switch said binary data file transceiver to receive the transmission if it is signalled as binary file data and, to continue to look for control signals in a frame of the transmission signalling a change from facsimile transmission or binary file data transmission and to switch the facsimile transceiver or binary file data transceiver as appropriate to then receive the transmission, and
        b.) as a source origination, to insert control signals in a frame of an outgoing transmission to signal whether the transmission is facsimile or binary file data,
    whereby both facsimile and binary file data can be transceived using facsimile communication protocols.

2. A system as claimed in claim 1, wherein said binary file data is sourced from or targeted to mass data storage means contained with the binary file data transceiver.

3. A system as claimed in claim 1, wherein said control signals are inserted in the Non Standard Frame of a facsimile transmission conducted under the CCITT T.30 Recommendation or the DIS/DTC/DCS signals of the CCITT T.30 proposals.

4. A facsimile machine for the transmission of documents on a communications channel, said facsimile machine being operable to provide facsimile transmission or binary file data transmission in the one continuous session and further comprising:
    data storage means for storing a binary file data, and
    processing means which is controllable to insert control signals in a frame of an outgoing transmission to signal if the transmission is facsimile or binary file data and to transmit either the facsimile or binary file date from said data storage means,
    whereby both facsimile and binary file data can be transmitted using facsimile communication protocols, and wherein said control signals are inserted in the Non Standard Frame of a facsimile transmission conducted under the CCITT T.30 Recommendation or the DIS/DTC/DCS or modified DIS/DTC/DCS signals of the CCITT T.30 Proposals.

5. A machine as claimed in claim 4, wherein said data storage means comprises a disk controller for reading binary file data stored on a disk.

6. A machine as claimed in claim 5, wherein the facsimile machine is also able to operate for reception such that received binary file data can be written to a disk, and said processing means is operable to look for control signals in a frame of an incoming transmission on the communications channel to determine if the transmission is a facsimile or binary file data and to switch the facsimile transceiver to receive the transmission if it is signalled as a facsimile transmission, and is further operable to switch the data storage means to receive the transmission if it is signalled as a binary file data, and to continue to look for control signals in a frame of the transmission signalling a change from facsimile transmission or binary file data transmission and to switch the facsimile transceiver or data storage means as appropriate to receive the remainder of the transmission.

7. A binary file data transceiver, adapted to be interposed at one end of a line of a public switched telephone network so as to be responsive to a transceived binary file data transmitted using facsimile protocols, comprising:

memory means for reading the binary file data contained therein or writing a binary file data thereto; and processing means which is controllable, a.) as a target destination, to look for control signals in a frame of an incoming transmission on the telephone network to determine if the transmission is a facsimile or binary file data and to switch the binary file data transceiver to receive the transmission if it is signalled as a binary file data, and b.) as a source origination to insert control signals in a frame of an outgoing transmission to signal the transmission is binary file data, whereby binary file data can be transceived using facsimile communication protocols.

8. A transceiver as claimed in claim 7, wherein said control signals are inserted in the Non Standard Frame of a facsimile transmission conducted under the CCITT T.30 Recommendation or the modified DIS/DTC/DSC signals of the T.30 proposals.

* * * * *